E. H. McHENRY.
SOLAR HEAT MOTOR.
APPLICATION FILED JUNE 2, 1909.
991,161.
Patented May 2, 1911.
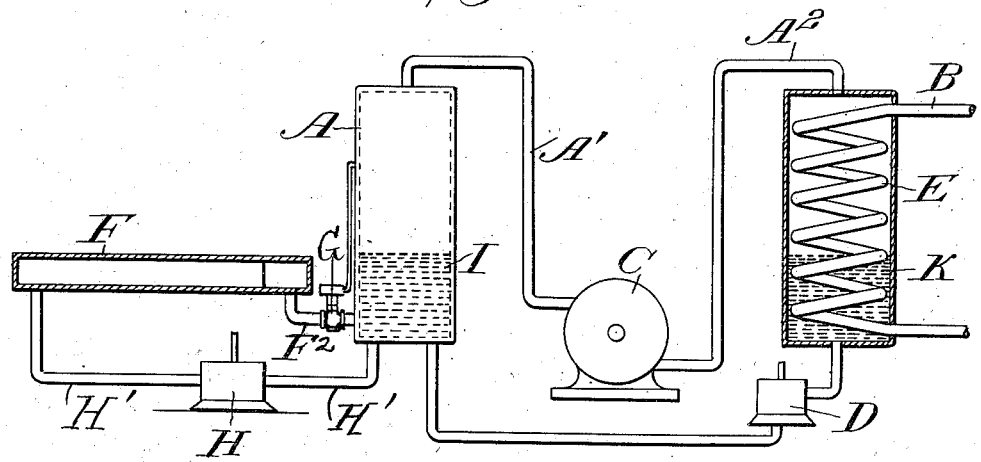
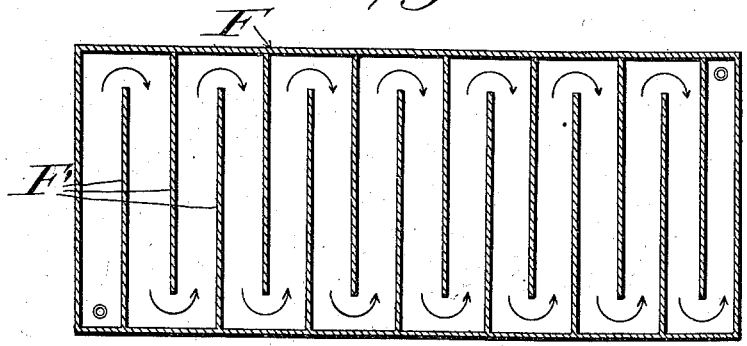
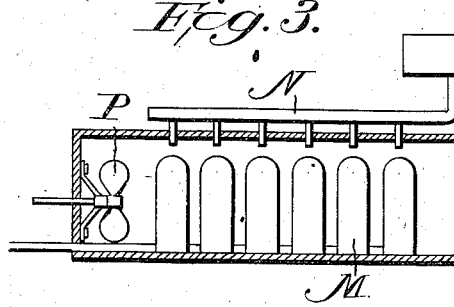
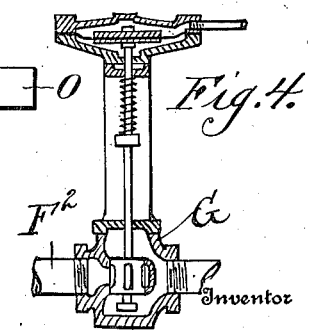

UNITED STATES PATENT OFFICE.

EDWIN H. McHENRY, OF NEW HAVEN, CONNECTICUT.

SOLAR-HEAT MOTOR.

991,161.  Specification of Letters Patent.  Patented May 2, 1911.

Application filed June 2, 1909. Serial No. 499,623.

*To all whom it may concern:*

Be it known that I, EDWIN H. MCHENRY, a citizen of the United States, residing at New Haven, in the county of New Haven, State of Connecticut, have invented certain new and useful Improvements in Solar-Heat Motors, of which the following is a description, reference being had to the accompanying drawing and to the letters and figures of reference marked thereon.

The invention relates to new and useful improvements in solar heat motors, that is, motors which are operated by atmospheric and solar heat.

An object of the invention is to provide a motor of the above character wherein the expansible operating fluid for the engine may be heated by direct exposure to solar or atmospheric heat.

In my prior Patent, #659,450, granted October 9th, 1900, I have shown a solar heat motor wherein a fluid is used to store and transmit heat to a vaporizer for heating an expansible fluid for operating the engine. In my present apparatus, I have provided means whereby the expansible fluid for operating the engine is heated directly. I have accomplished this by providing a vacuum chamber into which the heated expansible fluid may be passed and the vacuum in said chamber results in immediate liberation of a portion of the heat of the heated fluid in the form of steam or gas, which is expanded through the engine into a condenser, that is either water cooled or cooled by the evaporation of water on the outer surface of the condensing coils. The condensed fluid is then returned by means of a pump or pumps to the heat absorber, thus completing a connected cycle.

The invention consists in the parts and arrangements hereinafter described, or the equivalents thereof, as defined in the appended claims.

In the drawings, which show by way of illustration one embodiment of the invention; Figure 1 is a sectional view of certain of the parts, illustrating diagrammatically the essential features of my invention. Fig. 2 is a plan view in section of the heat collector. Fig. 3 shows diagrammatically a modified form of condenser. Fig. 4 is a detail view of the regulating valve.

In carrying out my invention, I have provided a heat absorber F which is composed of spaced sheets of heat conducting material which are connected at the sides and ends so as to form an inclosed chamber. Said chamber is preferably provided with oppositely extending partitions F', constituting a circulating passage through the heat absorber. A pipe F² leads to an expanding chamber or vaporizer A. The heat absorber is preferably provided with water although it is obvious that from certain aspects of the invention, any other suitable fluid may be used.

In the pipe F², I have provided a pressure valve G which is arranged to automatically maintain the desired degree of vacuum in the expansion chamber of vaporizer A. This may be accomplished by means of an ordinary thermostat or pressure regulator.

A pump H is connected by means of a pipe H' with the lower end of the expansion chamber, and with the heat absorber F and will cause the circulation through the heat absorber and expansion chamber.

The heated fluids pass into the expansion chamber or vaporizer in which a partial vacuum is maintained. The maintenance of this vacuum results in the immediate liberation of a portion of the heat of the water in the form of steam.

The steam is led through a pipe A' to an engine C which as herein diagrammatically illustrated is of the turbine type, although from certain aspects of the invention, any other form of engine may be used. The exhaust from the engine C is passed through a pipe A² to the condenser E. As shown in Fig. 1, this condenser is of the ordinary water cooled type, and is provided with a cold water condensing coil B. The condensed fluid or water from the condenser is returned by means of a pump D to the expansion chamber A. I have indicated the water level in the expansion chamber by the dotted line I and the water level in the condenser by the dotted line K.

Instead of using a condenser of the water cooled type, I may use a condenser as shown diagrammatically in Fig. 3, wherein the condensing coils M are preferably provided with an absorbent material on the outer surface thereof, which absorbent material is supplied with water through the pipe N, which is connected with a reservoir O.

A fan P causes the circulation of air through the condenser and the evaporation of water in the absorbent material increases the cooling efficiency of the condenser.

The starting effort for the engine may be supplied in any suitable way and after the engine begins its operation, the condenser maintains a normal vacuum. If communication is opened up between the condenser and the vaporizer between the ends of the cylinder, it is apparent that the steam will flow from the vaporizer to the condenser tending to equalize the pressures with the effect of causing a partial vacuum in the vaporizer. The flow into the vaporizer from the heat collector is automatically regulated and controlled by a thermostatic or pressure regulating valve, and by adjusting said valve, the degree of vacuum maintained in the vaporizer may be varied as will be obvious. In Fig. 4 is shown in detail such a regulator valve which, by a simple transposition of the spring and clapper on the valve stem, will perform the required functions. The valve is normally closed, in which position the spring pressure holds it in place; the pressures on each side of the flexible diaphragm being equalized. The production of a vacuum in the evaporating or expansion chamber destroys this balance, and it is evident that the pressure of the external atmosphere, acting on the lower side of the diaphragm, will cause it to lift when the difference between the external and internal pressures is sufficient to overcome the reaction of the spring. It is evident that the chamber above the flexible diaphragm must be connected with the steam space in the expansion chamber and that the spring tension must be adjusted to secure the desired degree of vacuum. Under operating conditions, it is clear that a valve so regulated would tend to maintain a constant degree of vacuum in the expansion chamber, as any diminution of pressure caused by increased consumption of steam, would act to open the valve wider, and *per contra* the tendency of the pressure to rise would be governed by the partial or complete closing of the valve. As the volume of steam liberated in the expansion chamber from the hot water is dependent upon the flow of hot water through the chamber, which is regulated by the valve, the action thus becomes automatic. Thus the special function of this regulator valve is to increase or throttle the flow of hot water into the vaporizer in such a manner as to insure the maintenance of a constant pressure in the vaporizer, which pressure would be less than atmospheric pressure. Under such conditions, the water will part with its surplus heat by the evaporation, the vapor being further expanded in passing through the engine cylinder to the condenser. Fluctuations of load or differences in the temperature of the hot water supply would be regulated by the greater or less admission of heated water necessary to maintain the desired constant pressure in the vaporizer.

The operation of my device will be apparent from the above disclosure. The water or fluid in the absorber F will be heated by exposure to solar or atmospheric heat, and as it passes into the vacuum chamber it will expand, producing steam or an expansible gas which may be conducted to the engine C through the pipe A'. The exhaust from the engine passes to the condenser and the condensed fluid is returned by the pump D to the vacuum chamber and is caused to return to the heat absorber by the pump H.

It will be evident therefore, that I have provided a solar motor wherein a fluid for operating the engine is heated by direct exposure to the solar or atmospheric heat.

Having thus described my invention, what I claim as new and desire to secure by Letters Patent, is:—

1. A solar motor including in combination, an engine, a heat absorber, an expansion chamber or vaporizer between said heat absorber and said engine, a pressure valve for regulating said expansion chamber or vaporizer, a condenser connected to said engine, and means for returning the condensed fluid from the condenser to the heat absorber.

2. A solar motor including in combination, a heat absorber wherein the expansible fluid may be exposed to atmospheric or solar heat, an expansion chamber or vaporizer, a pressure regulator between the heat absorber and said vaporizer, a pump for returning fluid from the vaporizer to said heat absorber, an engine with which said vaporizer is connected, a condenser for receiving the exhaust from said engine, and means for returning the fluid from the condenser to the vaporizer.

In testimony whereof I affix my signature, in presence of two witnesses.

EDWIN H. McHENRY.

Witnesses:
R. C. SCHNEIDER,
P. H. LAWLOR.